UNITED STATES PATENT OFFICE.

ISAAC PIESER AND CHARLES G. LIVINGSTON, OF CHICAGO, ILLINOIS.

CEREAL FOOD PRODUCT.

1,155,093.  Specification of Letters Patent.  Patented Sept. 28, 1915.

No Drawing.  Application filed January 11, 1915.  Serial No. 1,598.

*To all whom it may concern:*

Be it known that we, ISAAC PIESER and CHARLES G. LIVINGSTON, citizens of the United States, residing at Chicago, in the county of Cook and State of Illinois, have invented a new and useful Improvement in Cereal Food Products, of which the following is a specification.

Our invention relates to cereal food products, and more particularly to a blended or compounded cereal food having such chemical composition and physical characteristics as to render it suitable for use as a diet in the treatment of diabetes mellitus and kindred disorders arising from defective metabolism. It will be understood, however, that our product is not limited in use to such remedial functions, but, on the contrary, furnishes a palatable and nutritious substitute for the natural cereals and is capable of and designed for use not only as a corrective diet but as a food product for general consumption.

More specifically, it may be stated that it is the object of our invention to provide a cereal product having an unusually high percentage of proteids and a relatively low percentage of carbo-hydrates.

It is a further object of the invention to provide such a cereal product in which the proteid content is of a nature and quantity which will permit of the product being successfully formed into light bread, rolls, and other "raised" bakers' products which are commonly formed of wheat flour. The property of wheat flour by virtue of which a dough made from the flour will assume and maintain the well-known sponge-like formation of light bread we attribute to the proteid substance known as "gluten." According to Prof. Harvey W. Wiley and other writers on this subject, the substance called "gluten" is an addition or re-action product formed by the combination of two proteids, glutenin and gliadin, which occur in the natural cereal and combine or re-act in the presence of water and during the mixing of the dough to form the final product known as gluten. Whatever may be the origin of this proteid constituent, our experience convinces us that it is this constituent of the flour which is responsible for the successful formation of light breads, the gluten apparently possessing the property of binding together the mass of the dough and causing the latter to maintain its sponge-like or cellular structure after fermentation and the liberation of carbonic acid gas has ceased and during and after the baking operation.

In the treatment of diabetes mellitus it has long been recognized that oat-meal offers certain advantages as a diet (see *Journal of the American Medical Assn.*, vol. 52, page 1313). Without discussing the physiological action of this cereal, it may be stated in general that the proteids and carbo-hydrates contained in oats are peculiarly beneficial and superior to the wheat proteids and carbo-hydrates as a food for correcting certain classes of diseases resulting from faulty metabolism. The protein content of the oats, however, appears to differ from that of the wheat in another respect, *i. e.*, the oat proteids lack that property of binding the dough which is furnished by the glutenin and gliadin of the wheat proteids. Thus, a typical analysis of oat flour is as follows: proteids: 15%; starch and sugar (carbo-hydrates): 67%, while a typical analysis of a common grade of white wheat flour shows substantially the same proportions of these assimilable compounds, *i. e.*, proteids: 15.1%; starch and sugar (carbo-hydrates): 70%. It is apparent, therefore, that an analysis statement of the assimilable contents of the two cereals does not by any means give a true indication of either their widely different physiological action or of their physical properties.

Oat flour, which is well known and commonly used for the baking of crackers, cakes and other non-raised bakers' products, has always been regarded as unsuitable for use in the formation of the light breads, rolls, and the like. While we do not attempt to explain just what property of the oat-flour prevents it from forming a light dough, it is well recognized as a fact that oat-meal flour can not be successfully formed into light or raised bread.

We have discovered that by compounding or blending with an oat-flour certain constituents found in wheat flour, we are able to produce a compound cereal having a very high percentage of proteids and retaining the valuable curative properties of the pure oat-meal, and at the same time capable of being baked into loaves or rolls of light raised bread. This modification of the properties of the oat-flour we effect by the addition of "gluten flour" extracted from wheat. This so-called "gluten flour" may be manufactured in commercial quantities according to well known methods based essentially on the removal from wheat flour of a large portion of the starch and sugar content thereof. Various grades of gluten flour are available on the market, the protein content of the better grades of these gluten flours being upward of 35% of the total mass of the flour.

We find that by blending the gluten flour, extracted from wheat flour by removal of a large proportion of the starch and sugar from the latter, with an oat-meal flour, we are able to produce a compound cereal having an abnormally high percentage of proteids and possessing all those properties of ordinary wheat flour which render the latter the accepted cereal for the production of light or raised bakers' products. The percentage in which we prefer to form the mixture is as follows: oat meal flour: 60%; wheat gluten flour: 40%.

As before stated, the wheat gluten flour used will preferably have a protein content upward of 35%. If the protein content of the wheat flour be lower than this, the blended product will be deficient in "binding properties" and excessively high in wheat carbo-hydrates.

The wheat gluten flour itself has been frequently suggested for use as a diet in the treatment of diabetes mellitus, presumably because of the low carbo-hydrate content of this flour. The admixture of the relatively small proportion of wheat carbohydrates contained in the gluten flour does not affect seriously the curative or remedial effect of the oat-meal flour, and the wheat proteids are considered to be of value in themselves as a food product in the treatment of diabetes.

Our improved blended cereal product therefore retains substantially all of the physiological activity of the pure oat-meal but possesses such physical properties as to render it possible to form light bread from the blended cereal in the same manner and as successfully in every degree as the light breads formerly made only from the wheat flours.

While, as before stated, we prefer to compound our cereal from wheat gluten flour having a protein content of upward of 35% and to admix this gluten flour with oat-meal flour in the proportion of 60% oat flour to 40% wheat gluten flour, it should be understood that these specific proportions of the two cereals and particular quality of the wheat gluten flour employed are not necessary for carrying out our invention. We do not, therefore, wish to have our invention regarded as limited to the specific proportions employed, these specific proportions and qualities being merely illustrative and for the purpose of explaining the manner in which we prefer to carry out our invention in order to obtain the best results.

What we claim as new and desire to secure by Letters Patent is—

1. A blended cereal food product consisting essentially of oat meal flour and wheat gluten flour in substantially the proportions specified.

2. A blended cereal food product consisting essentially of oat meal flour and wheat gluten flour in the proportion, by weight, of 6 parts of the former to 4 parts of the latter.

3. A blended cereal food product consisting essentially of 6 parts, by weight, of oat meal flour and 4 parts, by weight, of wheat gluten flour having a protein content of upward of 35%.

ISAAC PIESER.
CHARLES G. LIVINGSTON.

In the presence of—
J. LOWENTHAL,
THEODORE HOLZ.